(12) United States Patent
Dinkel et al.

(10) Patent No.: US 6,231,131 B1
(45) Date of Patent: May 15, 2001

(54) HYDRAULIC BRAKE SYSTEM WITH ANTI-SKID CONTROL

(75) Inventors: Dieter Dinkel, Eppstein/Ts.; Albrecht Otto, Schoneck, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/101,411

(22) PCT Filed: Jan. 14, 1997

(86) PCT No.: PCT/EP97/00144
§ 371 Date: Dec. 17, 1998
§ 102(e) Date: Dec. 17, 1998

(87) PCT Pub. No.: WO97/26167
PCT Pub. Date: Jul. 24, 1997

(30) Foreign Application Priority Data

Jan. 16, 1996 (DE) ............................................. 196 01 268

(51) Int. Cl.[7] ..................................................... B60T 8/42
(52) U.S. Cl. ..................................... 303/115.4; 303/113.2
(58) Field of Search .............................. 303/115.4, 115.5, 303/115.1, 113.2, 113.3, 116.1, 116.2, 119.1, 900, 901, 10, 11, 12, 84.1, 84.2

(56) References Cited

U.S. PATENT DOCUMENTS

| | | | |
|---|---|---|---|
| 5,215,359 | * 6/1993 | Burgdorf et al. | 303/115.4 |
| 5,290,098 | * 3/1994 | Burgdorf et al. | 303/115.4 |
| 5,401,085 | * 3/1995 | Burgdorf et al. | 303/115.1 |
| 5,441,336 | * 8/1995 | Takeuchi | 303/116.1 |
| 5,486,040 | * 1/1996 | Beck et al. | 303/113.2 |
| 5,540,487 | * 7/1996 | Beck et al. | 303/116.1 |
| 5,547,266 | * 8/1996 | Beck et al. | 303/113.2 |

FOREIGN PATENT DOCUMENTS

| | | |
|---|---|---|
| 3505451 | * 7/1986 | (DE). |
| 3630052 | * 3/1988 | (DE). |
| 4224007 | * 1/1994 | (DE). |
| 4403445 | * 8/1995 | (DE). |

* cited by examiner

Primary Examiner—Robert J. Oberleitner
Assistant Examiner—Pamela J. Rodriguez
(74) Attorney, Agent, or Firm—Rader, Fishman & Grauer PL

(57) ABSTRACT

A system for retrofitting a four-valve ABS system for traction slip control. According to the present invention, only the wheel brakes associated with the driven wheels are furnished with outlet valves apart from the prevailing electromagnetically operated inlet valves. A separating valve is additionally inserted into the brake line, and a self-priming return pump is used which additionally has a suction line to the brake line between the master cylinder and the separating valve. Preferably, the suction line is adapted to be closed by a hydraulic valve. The separating valve may also be replaced by a hydraulically operated valve version. The resulting advantage is that at most four additional solenoid valves are required for the entire brake system in order to realize traction slip control.

5 Claims, 1 Drawing Sheet

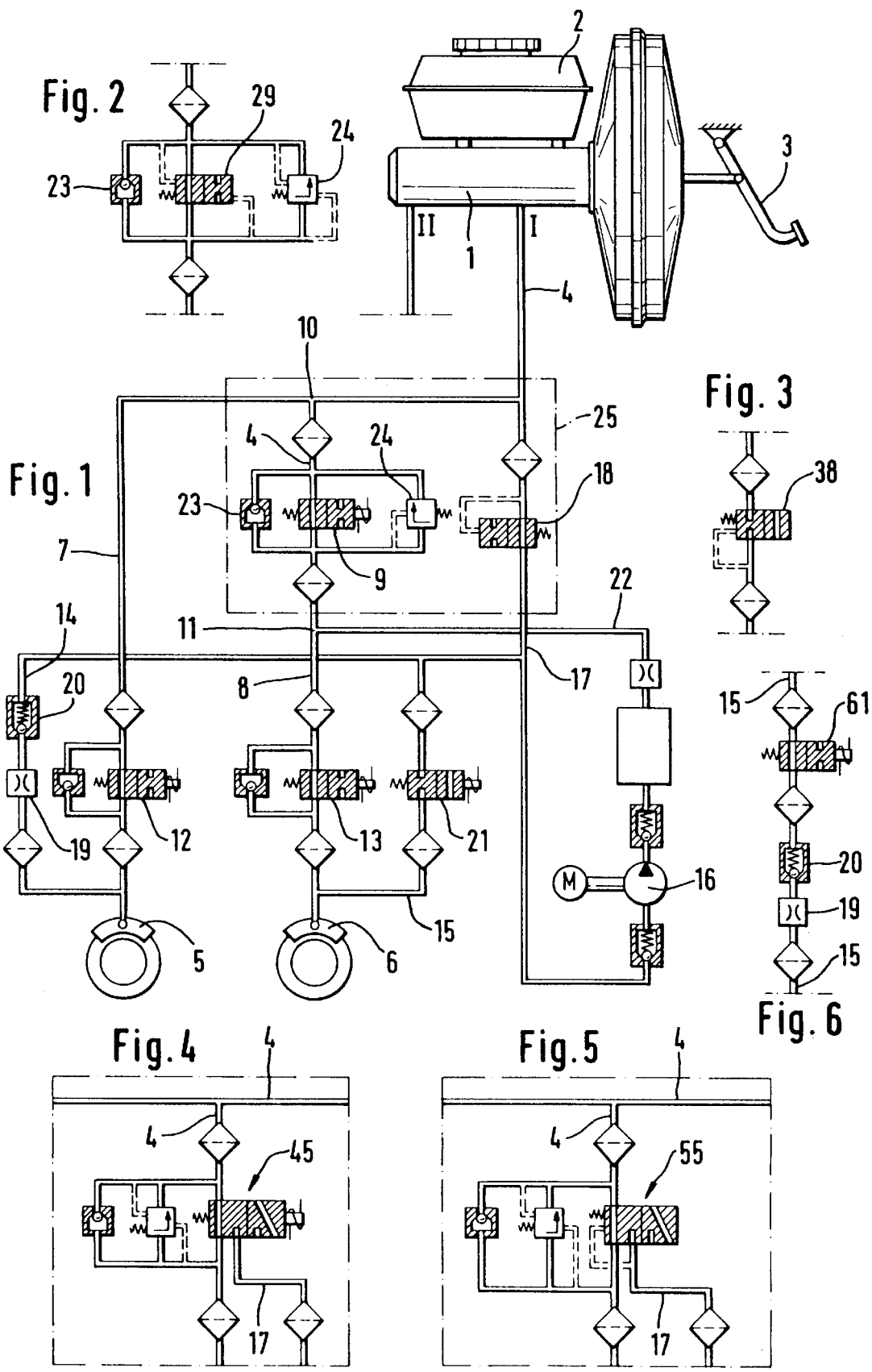

HYDRAULIC BRAKE SYSTEM WITH ANTI-SKID CONTROL

TECHNICAL FIELD

The present invention relates to a hydraulic brake systems and more particularly relates to traction control systems.

BACKGROUND OF THE INVENTION

A brake system of this type is disclosed in Japanese patent application No. 94-171487. The brake system concerned is an anti-lock brake system which, in contrast to conventional brake systems operating according to the recirculation principle, includes neither a low-pressure accumulator nor outlet valves in the return lines from the wheel brakes to the suction side of the return pump. To produce a dynamic pressure in the wheel brakes, the return lines have only restrictors which produce a pressure gradient between the wheel brakes and the suction side of the return pump. The pressure in the wheel brakes is reduced by closing the inlet valves in the brake branch lines to the wheel brakes so that the pump pressure will not reach the wheel brakes. The braking pressure is decreased because the pressure fluid is permanently discharged from the wheel brakes.

An object of the present invention is to retrofit a brake system of this type for traction slip control by minimum possible additional effort, i.e., the least number of electric lines the minimal additional logic structure for valves.

Thus, the present invention permits a brake system in vehicles with one driven axle to perform traction slip control operations by at most four additional solenoid valves. Only the driven wheels require an outlet valve which permits a sufficient braking pressure increase by the return pump alone. There is no need for a low-pressure accumulator in traction slip control. When three individual two-way/two-position directional control valves are chosen, alternatively, either the change-over valve in the suction line to the return pump or the separating valve in the brake line, or both these valves can be operated hydraulically. Solenoid valves are preferably used as outlet valves in order that an amount of braking pressure can be increased or decreased in the wheel brakes in conformity with requirements. When the change-over valve and the separating valve are united in a combination valve, the combination valve can either be actuated electromagnetically and, thus, necessitate the second actuation logic beside the outlet valve, or it can be configured as a hydraulically operated combination valve, thus obviating the need for further actuation and electric lines.

BRIEF DESCRIPTION OF THE DRAWINGS

FIG. 1 is a brake circuit of a brake system according to the present invention.

FIG. 2 is a hydraulically operated separating valve assembly which can replace the electromagnetically operated separating valve assembly of FIG. 1.

FIG. 3 is a hydraulically operated change-over valve which is closed in its unpressurized state and may replace the change-over valve in FIG. 1 which is open in its unpressurized state.

FIG. 4 is a combination valve which combines the function of a separating valve and a change-over valve according to FIG. 1.

FIG. 5 is a hydraulically operated combination valve.

FIG. 6 is an outlet valve combination which can replace the normally closed outlet valve of the FIG. 1 embodiment.

DETAILED DESCRIPTION OF THE PREFERRED EMBODIMENTS

The brake system of the FIG. 1 embodiment includes a master cylinder 1 which is connected to a supply reservoir 2 and is operable by a brake pedal 3. Two brake circuits I and II extend from the master cylinder 1. The brake circuits I and II are identical in design so that the illustration of brake circuit I is similarly applicable to brake circuit II (not shown). The return pumps of both brake circuits can be driven by one joint motor.

A brake line 4 extends from the master cylinder 1 via two brake circuits 7 and 8 to a wheel brake 5 or 6, respectively. Inserted into brake line 4 is a separating valve 9 which is configured as a normally open, electromagnetically operated two-way/two-position directional control valve. The brake branch line 7 to the wheel brake 5 branches from the brake line 4 at an intersection 10 between the master cylinder 1 and the separating valve 9. Brake branch line 8 to the wheel brake 6 branches from an intersection 11 which is positioned at the end of the brake line 4, i.e., beyond the separating valve 9 as viewed from the master cylinder 1.

An inlet valve 12 or 13 which is a normally open solenoid valve is respectively inserted into the brake branch lines 7 and 8. A return line 14 or 15 leads from each of the wheel brakes 5 and 6 to the suction side of a self-priming return pump 16. Beside the return lines 14 and 15, the suction side of the return pump 16 is still connected to the brake line 4 between master cylinder 1 and separating valve 9 by way of a suction line 17. The suction line 17 is closable by a hydraulically operated, normally open two-way/two-position change-over valve 18. Valve 18 is closed by the prevailing master cylinder pressure.

The pressure side of the return pump 16 is connected to the brake line by way of a pressure line 22 in the intersection 11.

The return line 14 of the wheel brake 5 does not have a solenoid valve but only a restrictor 19 and a non-return valve 20 which closes in the direction of the wheel brake 5. An electromagnetically operated, normally closed outlet valve 21 is interposed in the return line 15 of the wheel brake 6. During anti-lock control operations, the restrictor 19 and the non-return valve 20 provide a sufficient amount of dynamic pressure in the wheel brake 5. In wheel brake 6, braking pressure is generated and maintained because the outlet valve 21 is closed.

A non-return valve 23 and a pressure-relief valve 24 are connected in parallel to the separating valve 9. The non-return valve 23 permits a pressure fluid flow from the master cylinder 1 to the wheel brake 6, and the pressure-relief valve 24 opens in the presence of an excessive pressure in the brake branch line 8.

The brake circuit I shown is taken from a brake system with a diagonal brake circuit split-up. This means that traction slip control operations with only one driven axle require active braking intervention into respectively one wheel brake of each brake circuit. In this case, the wheel brake 6 is associated with a driven wheel, and wheel brake 5 is associated with a non-driven wheel. Accordingly, only the wheel brake 6 of the driven wheel is isolated from the master cylinder 1 when the separating valve 9 is closed. Wheel brake 5 of the non-driven wheel remains permanently connected to the master cylinder 1. However, active braking pressure build-up, (without application of the brake pedal only) by means of the supply pressure of the return pump 16, is necessary only in the wheel brake 6. Where the objective is to perform active braking intervention in the wheel brake 5 as well, be it for traction slip control, for yaw torque control, or for any other reason, the brake branch line 7 should be connected to the brake line 4 at the intersection 11 rather than at the intersection 10. In addition, the return line 14 is provided with a solenoid valve rather than with hydraulically operated components. For example, when the brake system has a front-axle/rear-axle brake circuit allotment and, consequently, the two wheel brakes of the driven wheels are arranged in one joint brake circuit, two outlet valves must be provided in this brake circuit for traction slip control operations. However, this provision obviates the need for outlet valves in the second brake circuit in which traction slip control is not required. In addition, the need for a separating valve is eliminated in the second brake circuit.

According to FIG. 2, the separating valve 9 can be replaced by a separating valve 29 which is hydraulically operated. In this separating valve 29, the master cylinder pressure acts in the opening direction, and the supply pressure of the return pump 16 acts so as to close the valve. When pressure from the master cylinder 1 and from the return pump 16 is applied, valve 29 remains in its open initial position shown, because the valve is acted upon by a spring in the opening direction. The arrangement of the non-return valve 23 and the pressure-relief valve 24 is identical to the arrangement in FIG. 1.

The change-over valve 38 of FIG. 3 can be considered as an alternative to the change-over valve 18 of FIG. 1. Valve 38 is also operated hydraulically, however, closed when unpressurized. The purpose of the control line, which permits the pressure on the suction side of the return pump 16 to act on the change-over valve 38 in the closing direction, is that in the event of a vacuum due to the return pump 16 running, the change-over valve 38 is quasi drawn to its open position. Should braking pressure be built up from the master cylinder 1 in this switch position, pressure in excess of atmospheric pressure will also develop downstream of the change-over valve 38. This excess pressure will act upon the change-over valve 38 so as to close it. As long as pedal-actuated braking of this type does not cause critical slip values, the pump is disconnected and remains out of operation until brake slip control becomes necessary. Even if the return pump 16 starts to aspirate again, the change-over valve 38 will not open initially as long as a sufficient quantity of pressure fluid is discharged through the return line 14 and, if necessary, through the return line 15 in order to feed the return pump 16. This is because the pressure will not drop below atmospheric pressure in the suction line 17 during this period so that the compression spring which acts upon the change-over valve 38 retains the change-over valve 38 in its closed initial position.

This version of a change-over valve may be configured in a simple manner as an electromagnetically operated change-over valve with a particularly simple actuation logic because it must only be opened when traction slip control or active braking is necessary. The valve may remain closed in all other situations. In this case, however, additional solenoid valves are required for a brake circuit 3 of this type in combination with the separating valve 9 of FIG. 1 and outlet valve 21 or another electromagnetically operated outlet valve. On the other hand, this may have the advantage that standard solenoid valves of a simple construction can be used. Thus, a variation of this type is appropriate when the expenditure in electric lines is insignificant and a corresponding actuation logic can be taken from other brake systems, for example. However, it is also possible to combine an electromagnetically operated change-over valve with a hydraulic separating valve according to FIG. 2 so that only two additional solenoid valves are used in brake circuit I also in this case.

FIG. 4 shows a combination valve which can be mounted instead of the box 25 in FIG. 1 (shown in dotted lines). The combination valve 45 is a combination made up of the separating valve 9 and an electromagnetically operated, normally closed change-over valve in the suction line 17. This means that the combination valve 45 in its initial position opens the brake line 4 and separates the suction line 17 from the master cylinder 1. In an energized switch position, however, the combination valve 45 causes connection of the suction line 1 and the master cylinder 1 and interruption of the brake line 4.

FIG. 5 shows a combination valve of this type in a hydraulically operated design. The combination valve 55 corresponds to a combination of the separating valve 29 in FIG. 2 and the change-over valve 38 in FIG. 3. It has the same control line like the change-over valve 38 in FIG. 3 so that its spring-loaded initial position shown, in which the brake line 4 is open, is always maintained as long as a vacuum prevails in the suction line 17 when the master cylinder is not operated. In this version of a combination valve 55, only one additional solenoid valve per wheel brake of a driven wheel is required, i.e., one outlet valve each, for retrofitting a brake system with traction slip control, exactly as is the case when jointly using the separating valve 29 and the change-over valve 38.

A solution as shown in the FIG. 6 embodiment is appropriate as an alternative of the outlet valve 21 in the return line 15. The outlet valve 61 shown in FIG. 6 is also electromagnetically operated, but open in its deenergized initial position. The advantage is that the outlet valve 61 must be closed only for traction slip control operations or any other active braking operations when it is connected in series with a restrictor 19 and a non-return valve 20, as can be found in the return line 14 of the wheel brake 5. During anti-lock control operations which are performed when the brake pedal 3 is applied, the hydraulic elements 19 and 20 are sufficient to produce a dynamic pressure in the return line 15 as well as in the return line 14. The actuation logic of an outlet valve 61 of this type is greatly simplified in comparison with a normally closed outlet valve 21.

What is claimed is:

1. Hydraulic brake system for use on a vehicle having at least one driven wheel, said vehicle of the type including a pedal-operated master cylinder connected to a supply reservoir and from which extends at least one brake circuit including a brake line extending from the master cylinder to at least one brake branch line of a wheel brake, an inlet valve connected in said at least one brake branch line, a pressure line which extends from a pressure side of a return pump and is connected to the brake line between the master cylinder and said at least one brake branch line, said system comprising:

an outlet valve positioned in a return line of the wheel brakes of only the at least one driven wheel, a two-way/two-position separating valve interposed into the brake line between the master cylinder and the connection of the pressure line, a suction line connected to the brake line between the master cylinder and a separating valve, wherein said suction line terminates at a suction side of the return pump, wherein the return pump is self-priming, and wherein a two-way/two-position change-over valve is inserted into the suction line, and wherein the change-over valve or the separating valve are hydraulically operated valves, wherein the change-over valve is a normally open valve.

2. Brake system as claimed in claim 1, wherein the change-over valve is a normally open valve.

3. Hydraulic brake system for use in a vehicle having at least one driven wheel, said vehicle also including a pedal-operated master cylinder that is connected to a supply reservoir and from which extends at least one brake circuit comprising:

a brake line extending from the master cylinder to at least one brake branch line of a wheel brake, one inlet valve in the at least one brake branch line, one return line between each wheel brake and a suction side of a return pump, a pressure line which extends from a pressure side of the return pump and is connected to the brake line between the master cylinder and at least one brake branch line, an outlet valve in the return lines of only the wheel brakes of said at least one driven wheel, a separating valve interposed in the brake line between the master cylinder and the connection of the pressure line, a suction line connected to the brake line between the master cylinder and the separating valve and terminates at a suction side of the return pump, wherein the return pump is self-priming type, a change-over valve inserted residing in the suction line, and wherein the separating valve and the change-over valve are structurally combined to a three-way/two-position combination valve which opens the brake line in its initial position and connects the master cylinder to the suction side of the return pump in its switch position.

4. Brake system as claimed in claim 3, wherein the combination valve is hydraulically operated.

5. Brake system as claimed in claim 3, wherein said outlet valve of the brake system is a normally open two-way/two-position solenoid valve.

* * * * *